United States Patent [19]
Saito et al.

[11] 3,859,325

[45] Jan. 7, 1975

[54] PROCESS FOR THE PRODUCTION OF METHACRYLONITRILE

[75] Inventors: Shigeru Saito, Tokyo; Jun Ishikura; Yutaka Sasaki, both of Yokohama; Kiyoshi Moriya, Kanagawa; Takashi Imada, Yokohama, all of Japan

[73] Assignee: Nitto Chemical Industry, Co., Ltd., Tokyo, Japan

[22] Filed: Mar. 13, 1972

[21] Appl. No.: 234,345

[30] Foreign Application Priority Data
Mar. 21, 1971    Japan.............................. 46-13098

[52] U.S. Cl. .............................................. 260/465.3
[51] Int. Cl. ............................................. C07c 121/02
[58] Field of Search .................................. 260/465.3

[56] References Cited
UNITED STATES PATENTS

| | | | |
|---|---|---|---|
| 3,232,978 | 2/1966 | Yasuhara et al................ | 260/465.3 |
| 3,254,110 | 5/1966 | Sennewald et al............... | 260/465.3 |
| 3,433,823 | 3/1969 | McMahon........................ | 260/465.3 |

FOREIGN PATENTS OR APPLICATIONS

| | | | |
|---|---|---|---|
| 38-14717 | 8/1963 | Japan.............................. | 260/465.3 |
| 41-3616 | 3/1966 | Japan.............................. | 260/465.3 |
| 41-6897 | 4/1966 | Japan.............................. | 260/465.3 |
| 41-7773 | 4/1966 | Japan.............................. | 260/465.3 |

*Primary Examiner*—Joseph P. Brust

[57] ABSTRACT

A process for the production of methacrylonitrile in high yields by vapor-phase catalytic ammoxidation of isobutene comprising the use of a catalyst containing as the active component a composition having the empirical formula $Fe_{10}W_{1-30}X_{0.01-15}Me_{0.01-5}O_{12-143}$ wherein X represents at least one element selected from the group consisting of P, B and Te, and Me represents V and/or Mo.

3 Claims, No Drawings

PROCESS FOR THE PRODUCTION OF METHACRYLONITRILE

BACKGROUND OF THE INVENTION

1. Field of the Invention

This invention relates to a process for the production of methacrylonitrile by vapor-phase catalytic ammoxidation of isobutene. The object of the invention is to carry out the above-mentioned reaction favorably by the use of a catalyst exerting a commercially efficient catalytic activity with respect to the formation of methacrylonitrile by ammoxidation of isobutene.

2. Description of the Prior Art

As for ammoxidation of olefins, there are many reports with respect to the production of acrylonitrile by ammoxidation of propylene, whereas very few reports regarding the production of methacrylonitrile by ammoxidation of isobutene. Propylene and isobutene are extremely different in reactivity in oxidation reactions, especially in the ammoxidation reaction. Therefore, there are encountred many difficulties in favorable production of methacrylonitrile, as commonly indicated in publications such as U.S. Pat. No. 3,346,617 and Japanese Patent Publication No. 7771/1966. Other known processes for the production of methacrylonitrile are such as those in Japanese Patent Publication No. 26390/1964, U.S. Pat. No. 3,461,150 and Japanese Patent Publication 7774/1967.

These processes, however, have some commercial problems unsolved regarding to low conversion to methacrylonitrile or short duration of the activity.

SUMMARY OF THE INVENTION

As a result of extensive investigations to overcome these disadvantages, we have found a novel catalyst composition with a long duration of the activity and a vary high conversion to methacrylonitrile. The present invention is based upon the finding as mentioned above.

As characteristic features of this invention particularly advantageous from the industrial point of view are mentioned high selectivity of methacrylonitrile under high conversion of isobutene without introduction of steam into the reaction system and duration of the high activity for a long period of time, low by-production of methacrolein inclined to make troubles in the recovery and purification systems of the product, low by-production of acetonitrile and low combustion of $NH_3$.

DESCRIPTION OF THE INVENTION

The catalyst used in this invention is an oxide composition containing iron, tungsten and at least one element selected from the group consisting of phosphorus, boron and tellurium. Other elements contained in the composition are vanadium and/or molybdenum. Proportions of the elements in the composition is also critical and compositions beyond the range as specified below will result in reduction of the activity or in much decline of durability of the activity.

This invention is concerned with a process for the production of methacrylonitrile which comprises contacting a mixture of isobutene, molecular oxygen and ammonia in vapor phase with a catalyst containing as the effective component a composition having the empirical formula $Fe_{10}W_aX_bMe_cO_d$ wherein X represents at least one element selected from the group consisting of P, B and Te, Me represents at least one element selected from the group consisting of V and Mo and the suffix $a$, $b$, $c$ and $d$ are atomic ratios in such ranges that $1 \leq a \leq 30$, $0.01 \leq b \leq 15$, $0.01 \leq c \leq 5$ and $d$ is a number corresponding to oxides formed by combination of the above-cited compounds which equals from 12 to 143.

The catalyst with the above-mentioned composition is prepared by any known method. It is especially preferable that all the components are intimately mixed. The exact chemical structure of the materials composing the catalyst is uncertain and the above-cited empirical formula is given as a result of analysis.

The starting material for providing the iron component in the catalyst may be selected from a variety of materials. For example, ferrous oxide, ferric oxide or iron oxide in the form of co-existing ferrous and ferric oxides may be employed. Alternatively, materials which finally afford a stabilized oxide of iron after subjected to chemical or calcination treatment may be used. As the materials of this nature are mentioned iron salts of inorganic acids such as iron nitrate and chloride, and iron salts of organic acids such as iron acetate and oxalate. These materials may be calcinated either after neutralization with an alkali such as ammonium to iron hydroxide or directly to yield iron oxide. In addition, iron hydroxide or metallic iron may be used. The metallic iron may be treated with heated nitric acid. In this case the iron is converted to ferric nitrate. Regardless of the starting material it is preferable to mix intimately with other components and it is preferable to add the material in such a form of fine powders, aqueous solution or sol.

The starting material for the tungsten component may be any water-soluble or -insoluble tungsten compound. For example, tungsten trioxide, tungstic acid, ammonium para-tungstate, ammonium meta-tungstate, tungsten halides and the like. As in the case of iron, caution of intimate mixing with other components applies as well.

The starting materials for the phosphorus or boron component may be selected from a wide variety of compounds that supply these elements. It is more common to add the material in the form of phosphoric or boric acid.

As the tellurium component may be employed any water-soluble or -insoluble tellurium compound. For example, tellurium dioxide, tellurous acid or telluric acid may be used. Alternatively, metallic tellurium may be used. It may be used as it is in powdery form or after its oxidation with heated nitric acid.

Any water-soluble or -insoluble vanadium compound may be used for the vanadium component. For example, vanadium pentoxide, ammonium meta-vanadate, vanadyl oxalate or vanadium halides may be employed.

The molybdenum component may come from any watersoluble or -insoluble molybdenum compound. For example, molybdenum trioxide, molybdic acid, ammonium para-molybdate, ammonium meta-molybdate, molybdenum halides and the like may be employed.

The catalyst exerts excellent activities without carrier but it may be used in combination with an appropriate carrier, which is advantageously contained in a proportion from 10 to 90% by weight of the entire catalyst. As the carrier may be used silica, alumina, zirconia, magnesia, silica-alumina, silicon carbide, alundum, inorganic silicate or the like. Any additives for improving physical properties of the catalyst such as binding agent may be added, if desired, unless it arises unfavorable effect. These additives such as carrier or binding agent may be optionally added regardless of the composition unless they do not cause remarkable changes in the characteristic features of the catalyst of this invention described herein above and in examples below. The catalyst containing such additives should be regarded as the catalyst of the present invention.

The catalyst of the invention may be employed either in the form of pellet in the fixed-bed reaction or in the form of powder in the fluidized-bed reaction.

The catalyst of this invention is prepared by mixing the starting materials in such a way as giving the predetermined composition, drying and calcining the same. Conditions under which calcination is conducted are important for providing the resulting catalyst with desired activities. It is preferable to heat the catalyst in the presence of oxygen at a temperature from about 400°C. to about 950°C. for a period from 2 to 48 hours.

As the feed gas are used a hydrocarbon, ammonia and oxygen, said hydrocarbon being substantially composed of isobutene. Nitrogen, steam or carbon dioxide may be simultaneously supplied as the diluent gas.

Air is preferably used as the oxygen source but a gas substantially composed of oxygen may also be used.

The molar ratios among the components of the feed gas are important; the oxygen to isobutene molar ratio is preferably from 1:1 to 5:1, and the ammonia to isobutene ratio from 1:1 to 5:1.

The reaction temperature is preferably in the range from 300°C. to 500°C. From the operational point of view the reaction is preferably conducted under around atmospheric pressure, but, if necessary, it may be conducted under elevated or reduced pressure. When the reaction is conducted under elevated pressure, the pressure is preferably below 5 kg./cm.$^2$G. Suitable contact time is from 0.1 to 20 seconds and a contact time of from about 0.5 to about 10 seconds produces especially good results. Contact time as referred to herein is defined by the following equation.

Contact time (sec.)

$$= \frac{\text{Apparent volume of the catalyst: (liter)}}{\text{Total volume of the feed gas at the reaction temperature supplied in a unit time [liter/sec.]}}$$

In carrying out the process of this invention either a fixed-bed reactor or a fluidized-bed reactor usually used for vapor-phase catalytic reactions can be employed.

Recovery of the desired product is effected by washing the reaction gas with water or an appropriate organic solvent. Purification is feasible by known distillation procedures.

DESCRIPTION OF PREFERRED EMBODIMENTS

Examples of the catalyst according to this invention and the ammoxidation reaction of isobutene using said catalyst are shown below. In order to demonstrate the characteristic features of the invention, comparative examples are also given.

EXAMPLES AND COMPARATIVE EXAMPLES

Test methods of the catalyst are as follows:
A. Activity test by the fixed-bed reaction
A U-type reactor having 16 mm.$\phi$ in inner diameter and 500 mm. in length was filled with 20 ml. of a catalyst in the form of a cylinder having 2mm.× 2mm.$\phi$ in size. The reactor was heated in a molten salt bath composed of equalamount mixture of sodium nitrite and potassium nitrate and maintained at a predetermined temperature.

A gas with the composition cited below was supplied into the reactor at a rate of 10 liter (calculated in terms of NTP) per hour. The reaction pressure was atmospheric one.

Air/ammonia/isobutene=17/1.3/1 (molar ratio)

The reaction was conducted at a successively varied temperature for 30 min. to 1 hour. The reaction gas was quantitatively analyzed by means of gas chromatography.

The reaction temperature at which conversion of isobutene to methacrylonitrile was maximum and the test results were determined and summarized in Table.

The contact time in these tests varies from 2.8 to 2.9 seconds.

In the present specification, total conversion of isobutene, conversion to methacrylonitrile and selectivity of methacrylonitrile are defined as follows:

Total conversion of isobutene $$= \frac{\text{Carbon weight of the reacted isobutene}}{\text{Carbon weight of the supplied isobutene}}$$

$$\times 100 \text{ (percent)}$$

Conversion to methacrylonitrile $$= \frac{\text{Carbon weight of the formed methacrylonitrile}}{\text{Carbon weight of the supplied isobutene}}$$

$$\times 100 \text{ (percent)}$$

Selectivity of methacrylonitrile $$= \frac{\text{Carbon weight of the formed methacrylonitrile}}{\text{Carbon weight of the reacted isobutene}}$$

$$\times 100 \text{ (percent)}$$

Catalyst 1

A catalyst with the empirical formula $Fe_{10}W_2Te_4Mo_{0.5}Si_{30}O_{91}$ was prepared as follows:

To a solution consisting of 120 ml. of nitric acid (specific gravity 1.38) and 150 ml. of water were added 11.2 g. of electrolytic iron powders to make complete solution. Into the resulting iron nitrate solution were dissolved 10.2 g. of metallic tellurium powders. (I)

10.4 g. of ammonium tungstate and 1.8 g. of ammonium molybdate were dissolved in 550 ml. of water. (II)

180 g. of silica sol (SiO 20% by weight) (III)

To a mixture of (I) and (III), (II) was added and the resulting mixture was heated to dryness with stirring. The dried mass was broken to pieces and calcined at 200°C. for 2 hours and at 400°C. for 2 hours followed by addition of water and kneading. The resulting mass was dried at 130°C. for 16 hours and calcined at 700°C. for 4 hours. Catalyst 2

A catalyst with the empirical formula $Fe_{10}W_{10}Te_5Mo_1Si_{50}O_{158}$ was prepared in accordance with the method for Catalyst 1. Final calcination was conducted at 700°C. for 4 hours.
Catalyst 3

A catalyst with the empirical formula $Fe_{10}W_{25}Te_{10}Mo_2Si_{30}O_{176}$ was prepared in accordance with the method for Catalyst 1. Final calcination was conducted at 600°C. for 4 hours.

Catalyst 4

A catalyst with the empirical formula $Fe_{10}W_{10}Te_2P_2Mo_1Si_{50}O_{157}$ was prepared in accordance with the method for Catalyst 1. As the starting material for P component was used phosphoric acid. Final calcination was conducted at 650°C. for 4 hours.

Catalyst 5

A catalyst with the empirical formula $Fe_{10}W_2Te_4V_1Si_{50}O_{131}$ was prepared in accordance with the method for Catalyst 1, except that ammonium meta-vanadate was used in place of ammonium molybdate. Final calcination was conducted at 600°C. for 4 hours.

Catalyst 6

A catalyst with the empirical formula $Fe_{10}W_{25}Te_{10}V_1Si_{50}O_{213}$ was prepared in accordance with the method for Catalyst 5. Final calcination was conducted at 600°C. for 4 hours.

Catalyst 7

A catalyst with the empirical formula $Fe_{10}W_{20}P_2Mo_1Si_{30}O_{143}$ was prepared in accordance with the method for Catalyst 1, except that phosphorus component was added in place of tellurium component. The starting material for the phosphorus component was phosphoric acid.

Final calcination was conducted at 600°C. for 4 hours.

Catalyst 8

A catalyst having the empirical formula $Fe_{10}W_{20}B_2Mo_1Si_{30}O_{141}$ was prepared in accordance with the method for Catalyst 1, except that boron component was added in place of tellurium component. The starting material for the boron component was boric acid.

Final calcination was conducted at 600°C. for 4 hrs.

Catalyst 9

A catalyst having the empirical formula $Fe_{10}W_2Si_{30}O_{81}$ was prepared in accordance with the method for Catalyst 1, except that none of tellurium and molybdenum components were added.

Final calcination was conducted at 900°C. for 2 hrs.

Catalyst 10

A catalyst having the empirical formula $Fe_{10}W_2Te_2Si_{30}O_{85}$ was prepared in accordance with the method for Catalyst 1, except that no molybdenum component was added.

Final calcination was conducted at 850°C. for 4 hrs.

Catalyst 11

A catalyst having the empirical formula $Fe_{10}W_{25}Te_4Si_{30}O_{158}$ was prepared in accordance with the method for Catalyst 10. Final calcination was conducted at 700°C. for 5 hours.

Catalyst 12

A catalyst having the empirical formula $Fe_{10}W_2B_1Si_{30}O_{83}$ was prepared in accordance with the method for Catalyst 1, except that no molybdenum component was added and boron component was used in place of tellurium component. Boric acid was used as the starting material for the boron component.

Final calcination was conducted at 900°C. for 2 hours.

Table

Results of ammoxidation reaction of isobutene

| Catalyst No. | Composition of the catalyst (atomic ratio) | | | | | Calcination conditions | Reaction temperature | Conversion to methacrylonitrile (%) | Total conversion of isobutene (%) | Selectivity of methacrylonitrile (%) |
|---|---|---|---|---|---|---|---|---|---|---|
| | Fe | W | X | Me | Si | | | | | |
| Examples | | | | | | | | | | |
| 1 | 1 | 10 | 2 | Te 4 | Mo 0.5 | 30 | 700°C. 4 hrs. | 400°C. | 70 | 98 | 71 |
| 2 | 2 | 10 | 10 | Te 5 | Mo 1 | 50 | 700°C. 4 hrs. | 410°C. | 77 | 99 | 78 |
| 3 | 3 | 10 | 25 | Te 10 Te 2 | Mo 2 | 30 | 600°C. 4 hrs. | 410°C. | 78 | 100 | 78 |
| 4 | 4 | 10 | 10 | P 2 | Mo 1 | 50 | 650°C. 4 hrs. | 410°C. | 70 | 99 | 71 |
| 5 | 5 | 10 | 2 | Te 4 | V 1 | 50 | 600°C. 4 hrs. | 400°C. | 63 | 100 | 63 |
| 6 | 6 | 10 | 25 | Te 10 | V 1 | 50 | 600°C. 4 hrs. | 400°C. | 67 | 98 | 68 |
| 7 | 7 | 10 | 20 | P 2 | Mo 1 | 30 | 600°C. 4 hrs. | 400°C. | 64 | 96 | 67 |
| 8 | 8 | 10 | 20 | B 2 | Mo 1 | 30 | 600°C. 4 hrs. | 400°C. | 64 | 98 | 65 |
| Comparative Examples | | | | | | | | | | |
| 1 | 9 | 10 | 2 | — | — | 30 | 900°C. 2 hrs. | 420°C. | 42 | 84 | 50 |
| 2 | 10 | 10 | 2 | Te 2 | — | 30 | 850°C. 5 hrs. | 430°C. | 63 | 95 | 66 |
| 3 | 11 | 10 | 25 | Te 4 | — | 30 | 700°C. 5 hrs. | 430°C. | 60 | 94 | 64 |
| 4 | 12 | 10 | 2 | B 1 | — | 30 | 900°C. 2 hrs. | 435°C. | 57 | 92 | 62 |

What we claim is:

1. Process for the production of methacrylonitrile from isobutene which comprises contacting a mixture of isobutene, molecular oxygen and ammonia in the vapor phase at a temperature in the range from 300°C. to 500°C., said mixture having a molar ratio of oxygen/isobutene from 1/1 to 5/1 and a molar ratio of ammonia/isobutene from 1/1 to 5/1, with a catalyst consisting of an oxide composition containing the elements in atomic ratio according to the formula $Fe_{10}W_aX_bMe_cO_d$ wherein X represents at least one element selected from the group consisting of phosphorus, boron and tellurium; Me represents at least one element selected from the group consisting of vanadium and molybdenum; the subscripts denote atomic ratio and have the values:

$a = 1-30$
$b = 0.01-15$
$c = 0.01-5$
$d = 12-143$ and $d$ is a value corresponding to the oxides formed from the above components by combination and is from 12 to 143, wherein said catalyst is produced by intimately mixing at least one compound of each of the respective elements in an aqueous system, heating to dryness and calcining in the present of oxygen at a temperature from about 400° to about 950°C. for 2 to 48 hours.

2. Process according to claim 1 wherein said catalyst contains from 10 to 90 percent by weight of a silica carrier.

3. Process according to claim 1 wherein the contact time of said mixture is in the range from 0.1 to 20 seconds.

* * * * *

UNITED STATES PATENT OFFICE
CERTIFICATE OF CORRECTION

PATENT NO. : 3,859,325
DATED : January 7, 1975
INVENTOR(S) : Saito, et al.

It is certified that error appears in the above-identified patent and that said Letters Patent are hereby corrected as shown below:

Convention date March 21, 1971 should read as March 12, 1971

Col. 5, line 2, "D" should read as "P"

Signed and sealed this 6th day of May 1975.

(SEAL)
Attest:

RUTH C. MASON
Attesting Officer

C. MARSHALL DANN
Commissioner of Patents
and Trademarks